United States Patent [19]

Doerman

[11] Patent Number: 4,584,870
[45] Date of Patent: Apr. 29, 1986

[54] MANUFACTURE OF CIGARETTES

[75] Inventor: Eryk S. Doerman, London, England

[73] Assignee: Molins PLC, London, England

[21] Appl. No.: 789,101

[22] Filed: Apr. 20, 1977

Related U.S. Application Data

[63] Continuation of Ser. No. 561,071, Mar. 24, 1975, abandoned.

[30] Foreign Application Priority Data

| Mar. 22, 1974 | [GB] | United Kingdom | 12925/74 |
| Mar. 20, 1975 | [FR] | France | 75 08688 |
| Mar. 20, 1975 | [JP] | Japan | 50-34195 |
| Mar. 21, 1975 | [DE] | Fed. Rep. of Germany | 25125842 |
| Mar. 21, 1975 | [IT] | Italy | 67722 A/75 |

[51] Int. Cl.⁴ .......................................... G01M 3/26
[52] U.S. Cl. .......................................... 73/40; 73/38
[58] Field of Search .................. 73/40, 41, 45, 45.1, 73/38; 235/151.13; 328/128

[56] References Cited

U.S. PATENT DOCUMENTS 3,464,549 9/1969 Armbruster ............... 235/151.13 X
3,696,294 10/1972 Krupka ........................... 324/105
3,892,951 7/1975 Stutz ............................... 73/160 X

FOREIGN PATENT DOCUMENTS 1217203 12/1970 United Kingdom .

Primary Examiner—Donald O. Woodiel
Attorney, Agent, or Firm—Antonelli, Terry & Wands

[57] ABSTRACT

Apparatus for testing the wrappers of cigarettes for leaks includes means for producing a series of first electrical signals indicative of the leakage flow through the wrappers of successive cigarettes, a comparator device for producing an ejection signal to eject each faulty cigarette, and an averaging device which responds to the running average level of the first signals and continuously varies the limit of the first signal which results in the production of an ejection signal by the comparator device, whereby that limit is raised when the running average of the first signals increases, and is lowered when the running average of the first signals falls.

33 Claims, 4 Drawing Figures

MANUFACTURE OF CIGARETTES

This application is a continuation of U.S. application Ser. No. 561,071, filed Mar. 24, 1975, now abandoned.

In the manufacture of cigarettes, it is known to provide apparatus for testing the cigarette wrappers for leaks and for ejecting cigarettes which allow an air flow through the wrappers above a predetermined limit. Examples of such cigarette testing apparatus are described in our British patent specification Nos. 1,036,889, 1,195,682 and 1,217,203.

It has been proposed to make provision for adjusting the sensitivity of the testing apparatus. This enables the user to adjust the upper limit of leakage through the wrapper with which the cigarettes are allowed to pass through to the cigarette packaging stage, cigarettes with a leakage above that limit being ejected.

According to the present invention, apparatus for testing the wrappers of cigarettes for leaks includes means for producing a series of first electrical signals indicative of the leakage flow through the wrappers of successive cigarettes, a comparator device for producing an ejection signal to eject each faulty cigarette, and an averaging device which responds to the running average level of the first signals and continuously varies the limit of the first signal which results in the production of an ejection signal by the comparator device, whereby that limit is raised when the running average of the first signals increases, and is lowered when the running average of the first signals falls.

One objective achieved by this invention is that the testing apparatus takes into account the varying pororsity of the cigarette paper. That is to say, when the cigarette paper porosity is above the normal for that paper, with the result that the total leakage through the finished cigarette wrappers is increased, the leakage limit for each cigarette is raised. This reduces the tendency for cigarettes to be ejected although they do not have any actual visible blemish such as a hole pierced in the wrapper paper by a piece of tobacco stem. On the other hand, when the porosity of the wrapper paper falls below the normal for that paper, the leakage threshhold for each cigarette is lowered, thus helping to ensure that a cigarette with a blemish, for example a hole in the cigarette paper or a faulty joint, is ejected even though the total air flow through the wrapper during testing is comparatively low on account of the low porosity of the paper.

Testing apparatus according to this invention also compensates automatically for variations in the average signal caused by other sources of "noise", for example changes in the diameter of the cigarettes which may, in some forms of test apparatus, vary the amount of air leakage through the seals of the wrapper testing device.

In one form of apparatus according to this invention the comparator device acts by comparing each first signal, possibly after amplification, with a reference input and by producing an ejection signal when the first signal reaches a predetermined level relative to the reference level, and in which the reference level is varied by the averaging device.

The averaging device may include a digital integrator. For example, the digital integrator may comprise a multiple-bit bidirectional up/down counter; means for feeding a regular clock pulse to the counter; each input signal coinciding or overlapping in time with one of the clock pulses, whereby each clock pulse records either an "up" count or a "down" count in the counter, depending upon whether or not it is accompanied by an input signal; and a multipe-bit digital-to-analogue converter which is connected to the counter and produces an output proportional at any given time to the state of the counts in the counter. The output of the converter may form or control the reference level for an auxiliary comparator which receives as its main input the first signals (possibly amplified) received by the first-mentioned comparator, each input signal for the counter being produced by the auxiliary comparator whenever the auxiliary comparator receives an input signal which exceeds a predetermined level in relation to the reference input for the auxiliary comparator. The output of the converter may be amplified by a variable-gain amplifier whereby the response time of the apparatus to changes in the average level of the fist signals is adjustable.

In a different apparatus according to this invention the averaging device comprises a heat-sensitive device having a heater which is powered by the amplified first signals and which controls the resistance of a heat-sensitive conducting portion which in turn controls the reference level of the comparator.

Another different form of apparatus according to this invention includes a variable-gain amplifier for amplifying the first signals, the amplified first signals being fed via an averaging device to a gain-control input of the variable-gain amplifier whereby the gain decreases as the average of the first signals increases, and increases as the average of the first signals decreases.

Examples of systems according to this invention will now be described with reference to the accompanying drawings. In these drawings.

Figure 1:
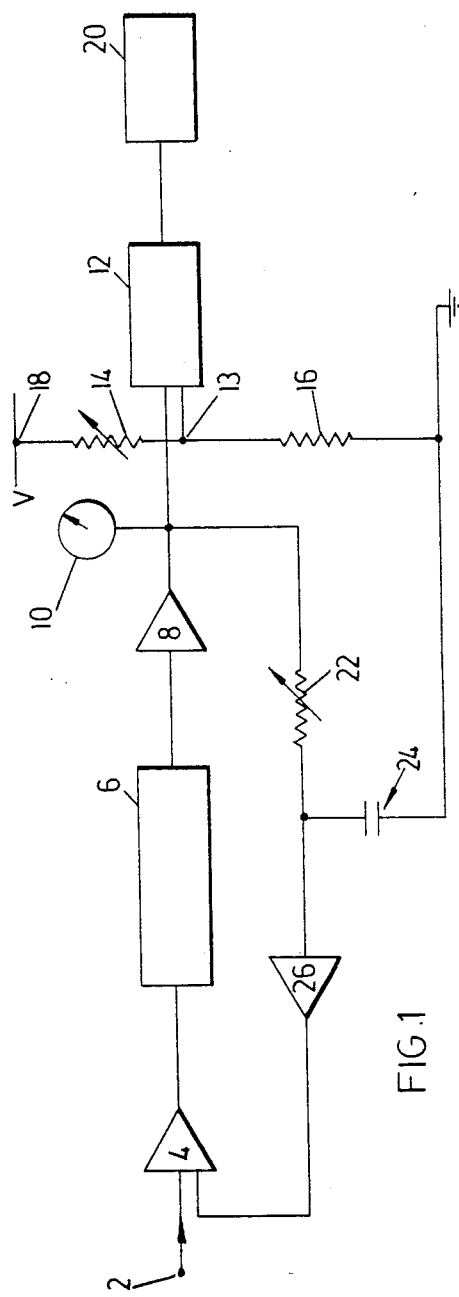
FIG. 1 is a circuit diagram showing one system.

FIG. 1 shows a circuit in which a terminal 2 is connected to the diaphragm transducer of a cigarette testing apparatus so as to receive electrical signals of which the magnitude depends upon the amount of leakage through successive cigarettes passing through the testing apparatus. The signals are modulated at 10K Hertz. A variable-gain amplifier 4 amplifies these signals, and the output from the amplifier 4 is fed to a detector 6 which demodulates the signals, providing a direct-current output which is fed to an amplifier 8. The output of the amplifier 8 is shown by a meter 10 and is fed into a comparator device 12. A reference input for the comparator device is provided at a terminal 13 by an adjustable bias resistor 14 and a fixed resistor 16 connected between a terminal 18 (which is at supply voltage V, for example 12 volts) and earth as shown. When the signal fed to the comparator device 12 from the amplifier 8 exceeds the reference signal (or when it exceeds it by more than a predetermined amount), the comparator device 12 emits a signal to an ejector device 20 as a result of which the faulty cigarette is later ejected.

The output of the amplifier 8 is used to provide a gain control voltage for the amplifier 4 via an averaging circuit comprising a variable resistor 22 and a capacitor 24, and via a further amplifier 26. As a result the gain of the amplifier 4 is varied so that the average of the signals fed to the comparator 12 from the amplifier 8 remains substantially constant.

Figure 2:
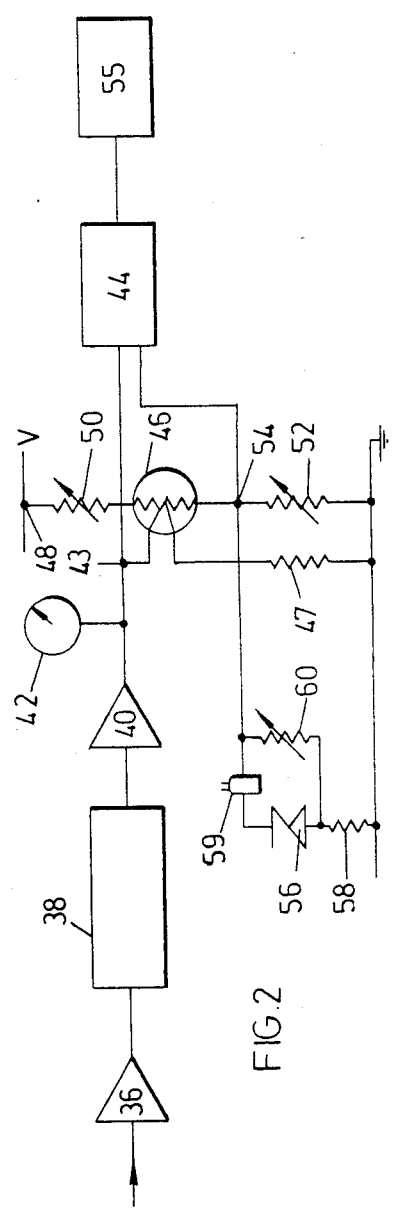
FIG. 2 is a circuit diagram of another system.

A different system according to this invention is shown in FIG. 2. This system is similar to the system of FIG. 1 in having a signal amplifier 36, a detector 38, a direct-current amplifier 40 and a meter 42. However, in this example the amplified direct-current signal is fed, from a junction 43, direct to a comparator device 44 and also through the heater of a thermistor 46; the heating circuit extends via a resistor 47 to earth.

The thermistor provides a variable resistance in a circuit extending between a terminal 48 (at supply voltage V) and earth, via variable resistors 50 and 52. Thus the potential at a terminal 54 varies according to the resistance of the thermistor, this potential being used as a reference level for the comparator device 44. The comparator device feeds an ejection signal to an ejector device 55 whenever the input signal from the terminal 43 is greater than the reference voltage at the terminal 54.

The heater of the thermistor 46 heats and cools relatively slowly and therefore follows the average value of the signals at the terminal 43. When that average value rises, the heater temperature rises, thus reducing the resistance of the thermistor and increasing the voltage at the terminal 54, i.e. the reference level for the comparator. The reverse happens when the average value falls; in other words, the voltage at the terminal 54 drops.

When the reference voltage at the terminal 54 exceeds a predetermined limit which is indicative of seriously faulty cigarette manufacture, a Zener diode 56 passes current from the terminal 54 to earth via a resistor 58. This flow of current is detected by means of a relay winding 59, and the relay then operates, for example, to stop the machine or to light up a warning light. The limit at which the Zener diode operates is adjustable by means of a variable resistor 60.

Figure 3:
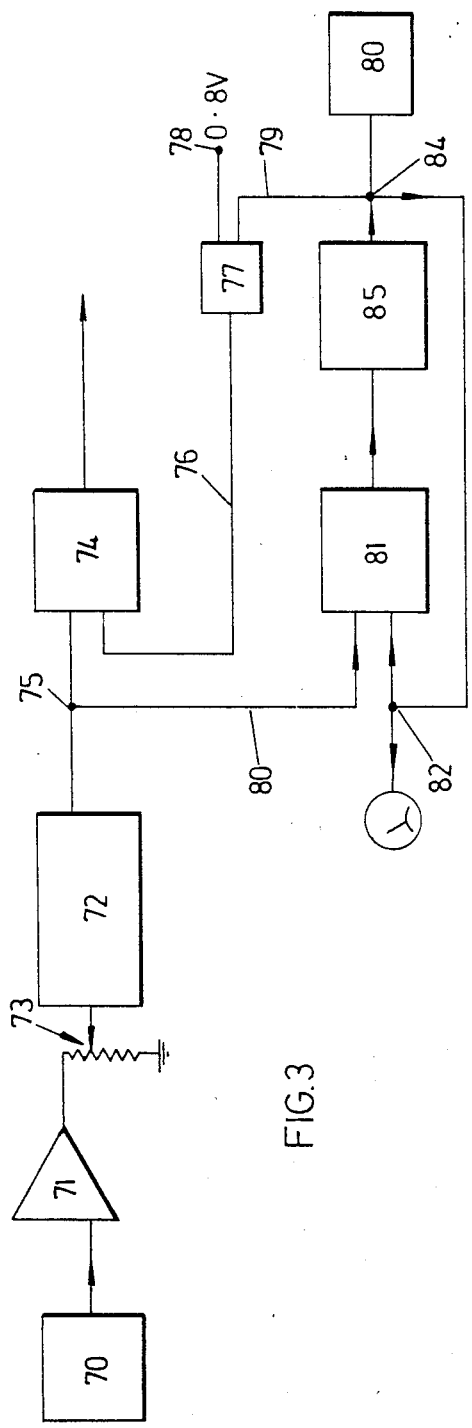
FIG. 3 is a circuit diagram of a third system including a digital integrator.

FIG. 3 shows a block diagram of a different system including a digital integrator. Signals indicative of the amount of air leakage through the cigarettes are obtained from a transducer 70, these signals being frequency modulated at 10K Hertz. An amplifier 71 amplifies the signals and feeds them to a detector device 72 via a potentiometer 73 by which the sensitivity of the system can be adjusted. The detector 72 comprises a circuit which demodulates the signal and provides a direct-current output to a comparator 74 via a terminal 75. The comparator 74 also receives a reference input via a line 76, and the comparator emits a fault signal, resulting in ejection of a cigarette, when the signal form the terminal 75 exceeds the reference input or a figure proportional to the reference input.

The reference input is obtained from a resistor network 77 which has two inputs, namely a fixed voltage input of 0.8 volts which is applied to a terminal 78, and a variable input which is applied to a terminal 79. When the input to the terminal 79 is equal to 0.4 volts, an output voltage 0.8 V is applied to the reference input 76 of the comparator 74 by the resistor network. On the other hand, when the input to the terminal 79 is greater or less than 0.4 volts by a given amount, the voltage applied to the reference input 76 is increased or decreased by the resistor network by the same amount of by slightly less, e.g. 95% of that amount.

The variable input to the terminal 79 is obtained as follows. From the terminal 75 there is a connection via a line 80 to a comparator 81. The comparator 81 also has an input terminal 82 which is connected by a line 83 to the output terminal 84 of a digital integrator 85. The terminal 84 is also connected to the terminal 79 and to a limit alarm device 88; this causes a light to flash when the voltage at the terminal is above or below predetermined limits.

Figure 4:
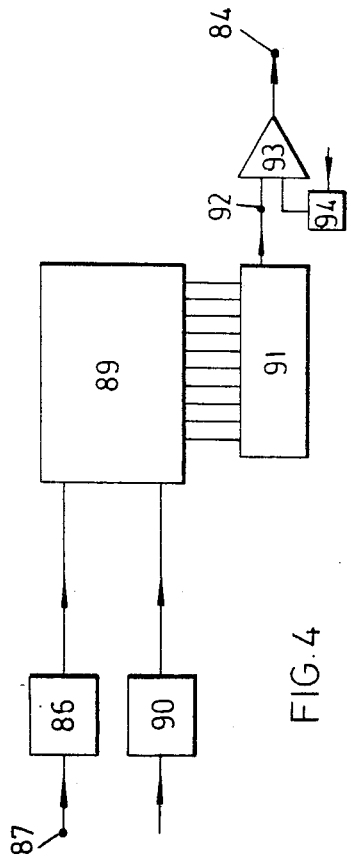
FIG. 4 is a circuit diagram showing the components of the digital integrator of the circuit shown in FIG. 3.

The arrangement of the integrator is shown in FIG. 4 and will be described further on. The function of the comparator 81 and integrator 85 is to provide a voltage level at the terminal 84 representing the average of the signals over a predetermined time period, the length of that time period being determined by the nature of the digital integrator, as described below.

The digital integrator is shown in FIG. 4. It comprises a monostable device 86 having an input terminal 87 which is connected to the output of the comparator 81 shown in FIG. 3, and an output terminal which is connected to a 12-bit bidirectional counter 89. The counter 89 also receives a clock pulse from a monostable device 90, this clock pulse being received from the cigarette testing apparatus, the frequency of the pulses corresponding to the frequency at which cigarettes pass through the test station.

The counter operates in response to the clock pulse. The monostable device 90 produces pulses of 1 millisecond duration. Whenever the signal fed to the comparator 81 (FIG. 3) through the input line 80 exceeds the voltage level at the reference terminal 82 of the comparator 81, the comparator 81 emits a signal which is stretched by the monostable device 86 to produce a signal of 8 millisecond duration. This ensures that, for the possible range of speeds of operation of the cigarette testing apparatus, there is always one clock pulse during each 8 millisecond signal emitted by the monostable device 86. The counter counts "up" whenever a clock pulse is accompanied by a signal at the terminal 87, and it counts "down" whenever a clock pulse is not accompanied by a signal at the terminal 87. The last 10 stages of the counter 89 are connected to a 10-bit digital-to-analogue converter 91 which provides a continuous output voltage at a terminal 92 proportional to the amount by which the "up" counts in the counter at any given moment exceed the "down" counts.

The terminal 92 is connected to the input of a variable-gain amplifier 93, the gain of the amplifier 93 being determined by the voltage applied by a control device 94 which can be set at any one of a number of levels, for example three levels giving respectively a slow, medium and fast response. For example, when the control device is set at the Slow position, the amplifier 93 gain is unity, with the result that a 0.1 volt change in the signal applied to the terminal 92 is produced by 460 "up" counts received by the counter 89. On the other hand, when the control device is set at the Medium position, the amplifier gain is doubled, so that the response time of the integrator is halved, an upward signal of 0.1 volts being produced by the amplifier 93 after only 230 "up" counts. In the Fast position of the control device, the gain is doubled again, and the response time is halved again.

It should be noted that the absolute value of the response time varies according to the frequency of the clock pulse; the integrator does not integrate over a predetermined time period regardless of the speed of operation of the testing apparatus, but integrates over a preset number of cigarettes.

I claim:

1. Apparatus for testing the wrappers of cigarettes for leaks comprising means for producing a series of first electrical signals indicative of the leakage flow through the wrappers of successive cigarettes, variable gain amplifier means for amplifying said first electrical signals, comparator means responsive to the output of said variable gain amplifier means for producing an ejection signal to eject a faulty cigarette producing a first signal which exceeds a preset limit, and averaging means responsive to the running average level of said first electrical signals for continuously varying the gain of said amplifier means to lower the gain thereof when the running average of said first signals increases and to increase the gain thereof when the running average of said first signals is lowered.

2. Apparatus according to claim 1 in which said averaging means comprises an adjustable series resistor and a capacitor connected to ground.

3. A method of testing the wrappers of cigarettes for leaks, comprising producing a series of first electrical signals having a magnitude indicative of the leakage flow through the wrappers of successive cigarettes, continuously averaging the first signals, and ejecting cigarettes which result in the production of first signals of a magnitude exceeding the average of said first signals by more than a predetermined amount.

4. A method of testing the wrappers of a plurality of cigarettes and other rod-like articles, comprising the steps of generating for each article a first signal indicative of the gas permeability of the wrapper of the article; generating a second signal by averaging out the gas permeabilities of a number of said articles, and processing the first and second signals to produce for each article a third signal indicative of the difference between the first and second signals to determine whether the wrapper of the tested article is defective.

5. A method as defined in claim 4, wherein said averaging out of the gas permeabilities of the wrappers of a number of said articles comprises averaging out the values of a plurality of signals having values dependent upon the gas permeabilities of the wrappers of a number of such articles.

6. A method as defined in claim 4, wherein said averaging out of the gas permeabilities of the wrappers of a number of said articles comprises averaging out the values of a plurality of signals derived from said first signals and having values dependent upon the gas permeabilities of the wrappers of a number of such articles.

7. A method as defined in claim 4, wherein the generation of the first signal comprises testing the wrapper of the article by pneumatic means and generating a pneumatic testing signal and then converting the pneumatic testing signal into an electrical signal constituting said first signal.

8. A method of testing the wrappers of a plurality of cigarettes and similar rod-like articles, comprising the steps of generating for each article a first signal indicative of the gas permeability of the wrapper of the article; generating a second signal indicative of the porosity of the material of the wrappers of the articles, processing the first and second signals to form for each article a third signal indicative, to an extent greater than the respective first signal, of the component of the gas permeability of the wrapper of the article not attributable to the porosity of the material of the wrapper, and comparing the third signal to a reference signal to determine whether the wrapper of the tested article is defective, wherein said step of generating said second signal comprises generating said second signal by averaging out the gas permeabilities of the wrappers of a number of such articles.

9. A method as defined in claim 8, wherein said averaging out of the gas permeabilities of the wrappers of a number of such articles comprises averaging out the values of a plurality of signals having values dependent upon the gas permeabilities of the wrappers of a number of such articles.

10. A method as defined in claim 8, wherein said averaging out of the gas permeabilities of the wrappers of a number of such articles comprises averaging out the values of a plurality of signals derived from said first signals and having values dependent upon the gas permeabilities of the wrappers of a number of such articles.

11. A method as defined in claim 8, wherein said averaging out of the gas permeabilities of the wrappers of a number of such articles comprises averaging out the values of the third signals generated for said number of articles.

12. A method as defined in claim 8, wherein the generation of the first signal comprises testing the wrapper of the article by pneumatic means and generating a pneumatic testing signal and then converting the pneumatic testing signal into an electrical signal constituting said first signal.

13. In an apparatus for testing the wrappers of a plurality of cigarettes and similar rod-like articles, in combination, first means for generating for each article a first signal indicative of the gas permeability of the wrapper of the article; second means for generating a second signal indicative of the porosity of the material of the wrappers of the articles by averaging out the gas permeabilities of the wrappers of a number of such articles; third means for processing the first and second signals to form for each article a third signal indicative, to an extent greater than the respective first signal, of the component of the gas permeability of the wrapper of the article not attributable to the porosity of the material of the wrapper, and comparing means operative for comparing the third signal to a reference signal to determine whether the wrapper of the tested article is defective.

14. Apparatus as defined in claim 13, wherein said second means comprises means operative for averaging out the values of a plurality of signals derived from said first signals and having values dependent upon the gas permeabilities of the wrappers of a number of such articles.

15. Apparatus as defined in claim 13, wherein said second means comprises means operative for averaging out the values of the third signals generated for said number of articles.

16. Apparatus for testing the wrappers of a plurality of cigarettes, and other rod-like articles, comprising in combination: first means for generating for each article a first signal indicative of the total gas permeability of the wrapper of the article; second means for generating a second signal by averaging out the first signals of a number of such articles; and third means for processing the first and second signals to form for each article a third signal indicative of the difference between the first and second signals to determine whether the wrapper of the tested article is defective.

17. Apparatus as defined in claim 16, wherein said second means comprises means operative for averaging out the values of a plurality of signals derived from said first signals and having values dependent upon the gas permeabilities of the wrappers of a number of such articles.

18. Apparatus according to claim 16 in which the third means comprises a comparator responsive to said first electrical signals and a predetermined voltage reference to eject each faulty cigarette when a first signal deviates by a prescribed amount from said predetermined voltage reference level, and said second means comprises averaging means responsive to the running average level of said first electrical signals for continuously varying said predetermined voltage reference level whereby that level is raised when the running average of the first signals increases and is lowered when the running average of the first signals falls.

19. Apparatus according to claim 16 in which said second means comprises a heat sensitive device connected to receive said first signals, said heat sensitive device exhibiting a variable resistance in response to variation in the level of said first signals, the output of said heat sensitive device providing said second signal.

20. Apparatus according to claim 19 in which said heat-sensitive device is connected in series with at least one resistor between a supply voltage line and ground to form a voltage divider, the second signal being taken from a point of said voltage divider at which the voltage increases as the temperature of the heat-sensitive conducting portion increases.

21. Apparatus according to claim 20 in which the resistor is connected in series with the heat-sensitive conducting portion and is adjustable, the reference input being taken from a point between the resistor and the heat sensitive portion.

22. Apparatus for testing the wrappers of cigarettes for leaks, including means for producing a series of first electrical signals indicative of the leakage flow through the wrappers of successive cigarettes, comparator means responsive to said first electrical signals and a predetermined voltage reference for producing an ejection signal to eject each faulty cigarette when a first signal deviates by a prescribed amount from said predetermined voltage reference level, and averaging means responsive to the running average level of said first electrical signals for continuously varying said predetermined voltage reference level, whereby that level is raised when the running average of the first signals increases, and is lowered when the running average of the first signals falls.

23. Apparatus according to claim 22, in which said averaging means comprises a heat-sensitive device having a heater connected to receive said first signals, said heat sensitive device exhibiting a variable resistance in response to variations in the level of said first signals, said heat-sensitive device being connected in control of the reference level of said comparator means.

24. Apparatus according to claim 23 in which said heat-sensitive device is connected in series with at least one resistor between a supply voltage line and ground to form a voltage divider, a reference input for said comparator means being connected to a point of said voltage divider at which the voltage increases as the temperature of the heat-sensitive conducting portion increases.

25. Apparatus according to claim 24 in which said resistor connected in series with the heat-sensitive device is adjustable, the reference input being taken from the point of connection between the resistor and the heat-sensitive device.

26. A method of testing the wrappers of a plurality of cigarettes and similar rod-like articles, comprising the steps of generating for each article a first signal indicative of the gas permeability of the wrapper of the article; generating a second signal by averaging out the gas permeabilities of the wrappers of a number of such articles, processing the first and second signals to form for each article a third signal indicative, to an extent greater than the respective first signal, of the component of the gas permeability of the wrapper of the article not attributable to the porosity of the material of the wrapper, and comparing the third signal to a reference signal to determine whether the wrapper of the tested article is defective, 27. A method as defined in claim 26, wherein said averaging out of the gas permeabilities of the wrappers of a number of such articles comprises averaging out the values of a plurality of signals having values dependent upon the gas permeabilities of the wrappers of a number of such articles.

28. A method as defined in claim 26, wherein said averaging out of the gas permeabilities of the wrappers of a number of such articles comprises averaging out the values of a plurality of signals derived from said first signals and having values dependent upon the gas permeabilities of the wrappers of a number of such articles.

29. A method as defined in claim 26, wherein said averaging out of the gas permeabilities of the wrappers of a number of such articles comprises averaging out the values of the third signals generated for said number of articles.

30. A method as defined in claim 26, wherein the generation of the first signal comprises testing the wrapper of the article by pneumatic means and generating a pneumatic testing signal and then converting the pneumatic testing signal into an electrical signal constituting said first signal.

31. In an apparatus for testing the wrappers of a plurality of cigarettes and similar rod-like articles, like, in combination, first means for generating for each article a first signal indicative of the gas permeability of the wrapper of the article; second means for generating a second signal by averaging out the gas permeabilities of the wrappers of a number of such articles; third means for processing the first and second signals to form for each article a third signal indicative, to an extent greater than the respective first signal, of the component of the gas permeability of the wrapper of the article not attributable to the porosity of the material of the wrapper, and comparing means operative for comparing the third signal to a reference signal to determine whether the wrapper of the tested article is defective.

32. Apparatus as defined in claim 31, wherein said second means comprises means operative for averaging out the values of a plurality of signals derived from said first signals and having values dependent upon the gas permeabilities of the wrappers of a number of such articles.

33. Apparatus as defined in claim 31, wherein said second means comprises means operative for averaging out the values of the third signals generated for said number of articles.

* * * * *